United States Patent
Kuhlthau et al.

[11] 3,886,152
[45] *May 27, 1975

[54] AMINODIARYL-INDOLYLMETHANE DYESTUFFS

[75] Inventors: Hans Peter Kuhlthau; Roderich Raue, both of Leverkusen, Germany

[73] Assignee: Bayer Aktiengesellschaft, Leverkusen-Bayerwerk, Germany

[ * ] Notice: The portion of the term of this patent subsequent to Feb. 15, 1989, has been disclaimed.

[22] Filed: Apr. 6, 1972

[21] Appl. No.: 241,855

Related U.S. Application Data

[63] Continuation of Ser. No. 788,633, Jan. 2, 1969, abandoned.

[52] U.S. Cl.... 260/247.5 FP; 260/42.21; 260/40 R; 260/326.15
[51] Int. Cl............................................. C07d 27/5
[58] Field of Search............... 260/326.15, 247.5

[56] References Cited
UNITED STATES PATENTS
3,642,823  2/1972  Raue et al...................... 260/326.15

*Primary Examiner*—Joseph A. Narcavage
*Attorney, Agent, or Firm*—Plumley & Tyner

[57] ABSTRACT

Compounds free of $SO_3H$ and $COOH$ group with the formula

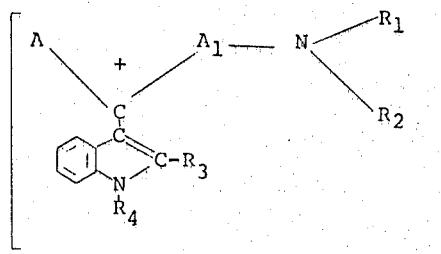

where
A and $A_1$ are aryl and at least one is of the naphthalene series
$R_1$, $R_2$ and $R_4$ are H, alkyl, aralkyl, cycloalkyl or aryl but $R_2$ is not aryl
$R_3$ is H, alkyl, aryl, carboxylic acid ester, N-substituted or unsubstituted carboxamide, or alkoxy and X is an anion,
are used for dyeing and printing leather, tannin-treated cotton, etc. or for preparing inks.

15 Claims, No Drawings

AMINODIARYL-INDOLYLMETHANE DYESTUFFS

This is a continuation of application Ser. No. 788,633 filed Jan. 2, 1969 now abandoned.

The invention relates to new sulphonic acid and carboxylic acid group-free aminodiaryl-indolylmethane dyestuffs of the general formula

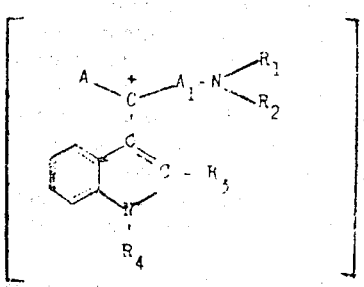

(I)

In the above formula
- A and $R_1$ represent aryl radicals, at least one of these aryl radicals represents a radical of the naphthalene series,
- $R_1$ denotes hydrogen, an alkyl, aralkyl, cycloalkyl or aryl radical,
- $R_2$ denotes hydrogen, an alkyl, aralkyl or cycloalkyl radical,
- $R_1$ and $R_2$ may also represent, together with the nitrogen atom, a heterocyclic ring,
- $R_3$ represents hydrogen, an alkyl or aryl group, a carboxylic acid ester group, an optionally N-substituted carboxamide group or an alkoxy group,
- $R_4$ denotes hydrogen, an alkyl, aralkyl, cycloalkyl or aryl radical, and
- $X^-$ is an anionic radical.

The new dyestuffs may contain in the aliphatic, cycloaliphatic and aromatic radicals, including the benzene ring illustrated by the above formula, further substituents with the exception of sulphonic acid and carboxylic acid groups. These substituents include, for example, lower alkyl and alkoxy radicals with 1 to 4 carbon atoms; aralkyl, such as benzyl; aralkoxy, such as benzyloxy; aryl, such as phenyl, and phenyl radicals substituted by non-ionic radicals, e.g. chlorophenyl, methylphenyl, ethylphenyl, nitrophenyl, cyanophenyl etc.; aryloxy groups, such as phenyloxy; halogen substituents, especially Cl and Br; carboxylic acid ester groups, especially carboxylic acid methyl ester and ethyl ester groups: optionally N-substituted carboxamide groups, lower alkyl groups being preferred as N-substituents which may be further substituted, e.g. by Cl, Br and OH: the cyano, nitro, hydroxyl or amino group: alkylsulphonyl, such as methyl-sulphonyl and ethyl-sulphonyl: aryl-sulphonyl, such as benzene-sulphonyl and p-toluene-sulphonyl; acyloxy groups, such as acetoxy and propionyloxy; acylamine groups, such as acetyl-amino, propionylamino, methyl-sulphonylamino, benzoylamino, benzene-sulphonylamino etc.; acyl radicals, such as the benzoyl and the acetyl radical.

Within the range of the new products of the general formula (I) one group of particularly valuable dyestuffs corresponds to the formula

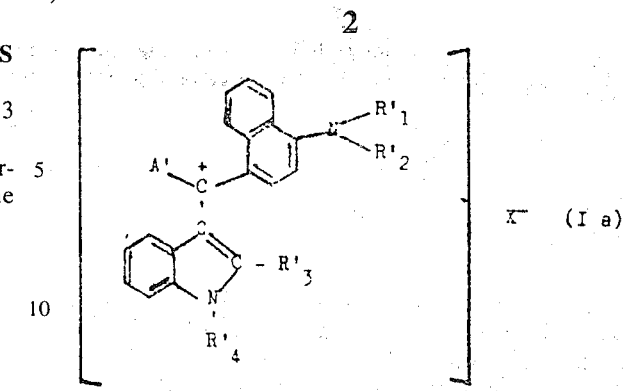

(I a)

In the above formula
- $R'_1$ stands for hydrogen, for a lower alkyl radical, especially methyl, ethyl, propyl, butyl, for a phenyl radical which may be further substituted by chlorine, bromine, lower alkyl or alkoxy radicals, or for benzyl;
- $R'_2$ stands for hydrogen, for a lower alkyl radical, such as methyl, ethyl or butyl, or for the benzyl radical;
- $R'_3$ stands for methyl or phenyl, or for phenyl substituted by chlorine, bromine or lower alkyl or alkoxy radicals;
- $R'_4$ stands for hydrogen, for a lower alkyl radical, such as methyl, ethyl or butyl, and for benzyl;
- $A'$ stands for a phenyl radical which may be substituted by halogen, especially chlorine or bromine, a lower alkyl radical, such as methyl, ethyl or propyl; or for a lower alkoxy radical, such as methoxy or ethoxy; those dyestuffs which contain in the radical $A'$ chlorine or bromine in one o-position attached to the central carbon atom, are characterised by especially clear shadee;
- X is an anionic radical.

Another group of particularly valuable dyestuffs within the range of the new products of the general formula (I) correspond to the formula

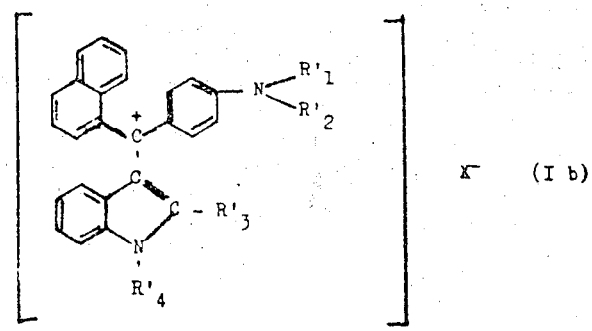

(I b)

In the above formula the substituents $R'_1$ to $R'_4$ and the radical X have the same meaning as in formula (Ia).

The new dyestuffs of the general formula (I) are obtained by condensing benzoyl- or napthoyl-arylamines of the general formula

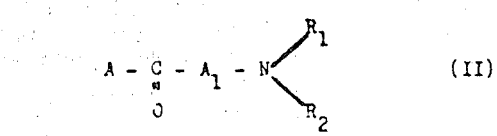

(II)

in which $R_1$, $R_2$, A and $A_1$ have the same meaning as above, with indole derivatives of the general formula

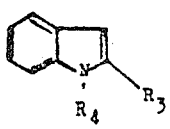 (III)

in which $R_3$ and $R_4$ have the same meaning as above, in the presence of acidic condensing agents to give dyestuffs of the formula (I), and selecting the starting components free from sulphonic acid and carboxylic acid groups.

Starting material suitable for the production of the dyestuffs according to the invention are, for example, the following benzoylamino-naphthalene and naphthoylarylamine compounds:

1-benzoyl-4-N,N-dimethylaminonaphthalene, 1-benzoyl-4-N,N-diethyl-aminonaphthalene, 1-benzoyl-4-N,N-dibutylaminonaphthalene, 1-benzoyl-4-N-methyl-N-oxethylaminonaphthalene, 1-benzoyl-4-N-methyl-N-chloro-ethylaminonaphthalene, 1-benzoyl-4-N-methyl-N-cyanoethylaminonaphthalene, 1-benzoyl-4-N,N-dioxethylaminonaphthalene, 1-benzoyl-4-N-ethyl-N-benzylaminonaphthalene, 1-benzoyl-4-N-phenyl-N-methyl-aminonaphthalene, 1-benzoyl-4-N-(4'-ethoxyphenyl)-N-methylamino-naphthalene, 1-(4'-methylbenzoyl)-4-N,N-dimethylaminonaphthalene, 1-(4'-methoxybenzoyl)-4-N,N-dimethylaminonaphthalene, 1-(4'-methoxybenzoyl)-4-N-phenyl-N-methylaminonaphthalene, 1-(2'-chlorobenzoyl)-4-N,N-dimethylaminonaphthalene, 1-(2'-chlorobenzoyl)-4-N,N-diethylaminonaphthalene, 1-(2'-chlorobenzoyl)-4-N-phenyl-N-methylaminonaphthalene, 1-(2'-bromobenzoyl)-2-N,N-dimethylaminonaphthalene, 1-(2'-bromobenzoyl)-4-N,N-diethylaminonaphthalene, 1-(2'-bromobenzoyl)-4-N-phenyl-N-methylaminonaphthalene, 1-(4'-chlorobenzoyl)-4-N,N-dimethylaminonaphthalene, 1-(1'-naphthoyl)-4-N-phenyl-N-methylaminonaphthalene, 4-(1'-naphthoyl)-1-N,N-dimethylaminobenzene, 4-(1'-naphthoyl)-1-N,N-diethylaminobenzene, 4-(1'-naphthoyl)-1-N,N-di-n-propylaminobenzene, 4-(1'-naphthoyl)-1-N-methyl-N-oxethylaminobenzene, 4-(1'-naphthoyl)-1-N-methyl-N-chloroethylaminobenzene, 4-(1'-naphthoyl)-1-N-methyl-N-cyanoethylaminobenzene, 4-(1'-naphthoyl)-1-N-ethyl-N-benzylaminobenzene, 4-(1'-naphthoyl)-1-N-methyl-N-phenylaminobenzene, 4-(1'-naphthoyl)-1-N-methyl-N-(4''-ethoxyphenyl)-aminobenzene, 4-(2'-naphthoyl)-1-N,N-dimethylaminobenzene, 4-(2'-naphthoyl)-1-N,N-diethylaminobenzene, 4-(2'-naphthoyl)-1-N-methyl-N-phenylaminobenzene, 1-(4'-N,N-dimethylaminobenzoyl)-4-chloronaphthalene, 2-(4'-N-phenyl-N-methylaminobenzoyl)-3-chloronaphthalene, 1-(4'-N,N-dimethylaminobenzoyl)-6-methylnaphthalene.

Suitable indole derivatives are, for example: 2-methylindole, 2-phenylindole, 2,5-dimethylindole, 2-methyl-5-chloroindole, 2-phenyl-5-methylindole, 2-phenyl-5-chloroindole, 1,2-dimethylindole, 1-methyl-2-phenylindole, 1,2,5-trimethylindole, 1,5-dimethyl-2-phenylindole, 1,2-dimethyl-5-chloroindole, 1-methyl-2-phenyl-5-chloroindole, 1-ethyl-2-methylindole, 1-ethyl-2-phenylindole, 1-ethyl-2,5-dimethylindole, 1-ethyl-2-phenyl-5-methylindole, 1-ethyl-2-methyl-5-chloroindole, 1-ethyl-2-phenyl-5-chloroindole, 1-benzyl-2-methylindole, 1,4,7-trimethyl-2-phenylindole, 1-n-butyl-2-phenylindole, 1-isobutyl-2-(4'-chlorophenyl)-4,6-dimethylindole, 1-cyano-ethyl-2-methylindole, 1-cyanoethyl-2-phenylindole.

Suitable acidic condensing agents are, for example: phosphorus oxychloride, phosphorus pentoxide, thionyl chloride, phosgene, zinc chloride, aluminium chloride, tin chloride, sulphuric acid or phosphoric acid.

The reaction can be carried out in the presence or absence of an inert solvent. Suitable solvents are, for example, chlorobenzene, o-dichlorobenzene, toluene, xylene, benzene, ligroin, dioxan, cyclohexane, carbon tetrachloride, chloroform or ethylene chloride.

The reaction is generally carried out at an elevated temperature, e.g. at 40° to 160°C, preferably at 70° to 120°C.

According to another process, the dyestuffs of the formula (I) can also be prepared by condensation of benzoylor naphthoyl-indoles of the general formula

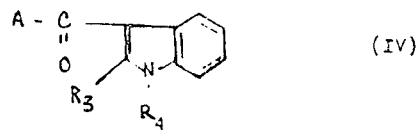 (IV)

with aromatic amines of the general formulae

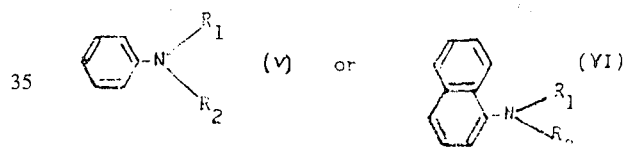

in which the radicals A and $R_1$ to $R_4$ have the same meaning as above,
and the components are to be selected in such a manner that the resultant dyestuff contains at least one naphthalene radical A (or $A_1$) attached to the central carbon atom, but contains no sulphonic acid and carboxylic acid groups.

Suitable indole derivates of the general formula (IV) are the following, for example:

1-methyl-2-phenyl-3-(1'-naphthoyl)-indole, 1-methyl-2-phenyl-3-(2'-naphthoyl)-indole, 1,2-dimethyl-3-(1'-naphthoyl)-indole, 1,2-dimethyl-3-(2'-naphthoyl)-indole, 1-methyl-2-phenyl-3-benzoylindole, 1,2-dimethyl-3-benzoylindole, 1,2,5-trime-thyl-3-benzoylindole, 1,5-dimethyl-2-phenyl-3-benzoylindole, 1,2-dimethyl-3-benzoyl-5-chloroindole, 1-methyl-2-phenyl-3-benzoyl-5-chloroindole, 1-ethyl-2-methyl-3-benzoylindole, 1-ethyl-2-phenyl-3-benzoylindole, 1-benzyl-2-methyl-3-benzoylindole, 1,4,7-trimethyl-2-phenyl-3-benzoylindole, 1-n-butyl-2-phenyl-3-benzoylindole, 1-cyanoethyl-2-methyl-3-benzoylindole, 1-cyanoethyl-2-phenyl-3-benzoylindole, 1-methyl-2-(2'-chlorophenyl)-3-benzoylindole, 1-methyl-2-phenyl-3-(2'-chlorobenzoyl)-indole, 1-methyl-2-phenyl-3-(3'-chlorobenzoyl)-indole, 1-methyl-2-phenyl-3-(4'-methylbenzoyl)-indole, 1,2-dimethyl-3-(2'-chlorobenzoyl)-indole, 1-ethyl-2-methyl-3-(2'- chlorobenzoyl)-indole and 1-ethyl-2-phenyl-3-(2'-chlorobenzoyl)-indole.

Suitable aromatic amines of the general formula (V) are, for example:

N,N-dimethylaniline, N,N-diethylaniline, N,N-dibutylaniline, N-methyl-N-oxethylaniline, N,N-dioxethylaniline, N-methyl-N-chloroethylaniline, 1-N-ethyl-N-oxethylamino-3-methylbenzene, N-butyl-N-oxethylaniline, N-ethyl-N-benzylaniline, N-methyldiphenylamine, N-ethyldiphenylamine N-cyanoethyldiphenylamine, N-(4-ethoxyphenyl)-N-methylaniline, 3-methoxy-1N,N-dimethylaniline, 3-ethoxy-1-N,N-diethylaniline.

Suitable aromatic amines of the general formula (VI) are the following, for example:

1-N,N-dimethylaminonaphthalene, 1-N,N-diethylaminonaphthalene, 1-N,N-dibutylaminonaphthalene, 1-N-methyl-N-oxethylaminonaphthalene, 1-N-methyl-N-chloroethylaminonaphthalene, 1-N-methyl-N-cyanoethylaminonaphthalene and 1-N-methyl-N-phenylaminonaphthalene.

The compounds indicated for the first process are suitable as acidic condensing agents and as solvents.

The anionic radicals $X^-$ can be inorganic as well as organic ions; there are to be mentioned, for example: $Cl^-$, $Br^-$, $J^-$, $CH_3SO_4^-$, $C_2H_5SO_4^-$, p-toluene sulphonate, $HSO_4^-$, benzene sulphonate, p-chlorobenzene sulphonate, phosphate, acetate, formate, propionate, oxalate, lactate, maleinate, crotonate, tartrate, citrate, $NO_3^-$, perchlorate, $ZnCl_3^-$. The type of the anionic radicals is of no importance for the properties of the dyestuffs, provided largely colourless radicals are concerned which do not impair the solubility of the dyestuffs in an undesirable way.

The products obtainable according to the present process are valuable dyestuffs which can be used for the dyeing and printing of materials of leather, tannin-treated cotton, cellulose acetate, synthetic superpolyamides and superpolyurethanes, as well as for the dyeing of lignin-containing fibres, such as coconut fibres, jute, and sisal. They are also suitable for the production of writing inks, pad-inks, ballpoint pen pastes, and they may also be used for offset printing. They are especially well suited for the dyeing and printing of materials which consist completely or partially of polymerised acrylonitrile and/or vinylidene cyanide, and also for the dyeing of acid-modified polyester fibres, for example, of sulpho group-containing terephthalic acid and ethylene glycol. The dyeings obtained on acrylonitrile-containing material are distinguished by very good fastness to light, wet processing, rubbing and sublimation. With anionic precipitants, such as alumina, tannin, phosphotungstic (molybdenum) acids, the dyestuffs form light-fast pigments which can advantageously be used for paper printing.

EXAMPLE 1

15 Parts by weight 1-(1'-naphthoyl)-4-N-methyl-N-phenylaminobenzene, 9.2 parts by weight 1-methyl-2-phenylindole and 20.0 parts by weight phosphorus oxychloride are condensed at 100°C for 4 hours. The melt is then poured into 1,000 parts by volume of water and stirred for 3 hours. After separating the supernatant solution from the dye resin, the dyestuff is dissolved in 1,800 parts by volume of boiling water, the solution clarified with active charcoal and the dyestuff salted out by the addition of 50 parts by weight sodium chloride. The resultant dyestuff of the formula

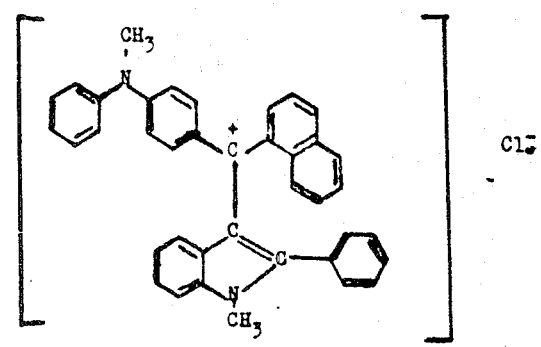

dyes materials of polyacrylonitrile in a blue-green shade of excellent fastness to light.

Valuable dyestuffs which dye polyacrylonitrile in the specified shades are also obtained when the following indole derivatives are reacted in the same way with the stated diarylketones:

| Indole | Diaryl ketone | Shade on polyacrylonitrile |
| --- | --- | --- |
| 1,2-dimethylindole | 1-benzoyl-4-dimethylaminonaphthalene | strongly greenish blue |
| 1-methyl-2-phenylindole | 1-benzoyl-4-dimethylaminonaphthalene | blue-green |
| 1,2-dimethylindole | 1-(2'-chlorobenzoyl)-4-dimethylaminonaphthalene | strongly greenish blue |
| 1-methyl-2-phenylindole | 1-(2'-chlorobenzoyl)-4-dimethylaminonaphthalene | grey-green |
| 1,2-dimethylindole | 1-(4'-chlorobenzoyl)-4-dimethylaminonaphthalene | greenish blue |
| 1-methyl-2-phenylindole | 1-(4'-chlorobenzoyl)-4-dimethylaminonaphthalene | bluish green |
| 1,2-dimethylindole | 1-(4'-methoxybenzoyl)-4-dimethylaminonaphthalene | somewhat bluish green |
| 1-methyl-2-phenylindole | 1-(4'-methoxybenzoyl)-4-dimethylaminonaphthalene | somewhat bluish green |
| 1-cyanoethyl-2-methylindole | 1-(4'-methoxybenzoyl)-4-dimethylaminonaphthalene | grey |
| 1-cyanoethyl-2-phenylindole | 1-(4'-methoxybenzoyl)-4-dimethylaminonaphthalene | subdued blue-green |
| 1,2-dimethylindole | 1-benzoyl-4-phenylmethylaminonaphthalene | somewhat greenish blue |
| 1-methyl-2-phenylindole | 1-benzoyl-4-phenylmethylaminonaphthalene | bluish green |
| 1,2-dimethylindole | 1-(2'-chlorobenzoyl)-4-phenylmethylaminonaphthalene | somewhat greenish blue |
| 1-methyl-2-phenylindole | 1-(2'-chlorobenzoyl)-4-phenylmethylaminonaphthalene | clear blue-green |
| 1,2-dimethylindole | 1-(2'-bromobenzoyl)-4-phenylmethylaminonaphthalene | somewhat greenish blue |
| 1-methyl-2-phenylindole | 1-(2'-bromobenzoyl)-4-phenylmethylaminonaphthalene | blue-green |
| 1,2-dimethylindole | 1-(4'-methoxybenzoyl)-4-phenylmethylaminonaphthalene | strongly bluish violet |
| 1-methyl-2-phenylindole | 1-(4'-methoxybenzoyl)-4-phenylmethylaminonaphthalene | greenish grey |
| 1,2-dimethylindole | 4-(1'-naphthoyl)-1-dimethylaminobenzene | currant-grey |
| 1-methyl-2-phenylindole | 4-(1'-naphthoyl)-1-dimethylaminobenzene | greenish blue |
| 1-ethyl-2-methylindole | 4-(1'-naphthoyl)-1-dimethylaminobenzene | strongly reddish blue-grey |
| 1-ethyl-2-phenylindole | 4-(1'-naphthoyl)-1-dimethylaminobenzene | greenish blue |

—Continued

| Indole | Diaryl ketone | Shade on polyacrylonitrile |
|---|---|---|
| 2-methylindole | 4-(1'-naphthoyl)-1-dimethylaminobenzene | strongly bluish Bordeaux |
| 2-phenylindole | 4-(1'-naphthoyl)-1-dimethylaminobenzene | greenish blue |
| 1,5-dimethyl-2-phenylindole | 4-(1'-naphthoyl)-1-dimethylaminobenzene | subdued strongly greenish blue |
| 1-ethyl-2-phenyl-5-methylindole | 4-(1'-naphthoyl)-1-dimethylaminobenzene | strongly greenish blue |
| 1,2-dimethylindole | 4-(1'-naphthoyl)-1-diethylaminobenzene | blue-grey |
| 1-methyl-2-phenylindole | 4-(1'-naphthoyl)-1-diethylaminobenzene | strongly greenish blue |
| 1,2-dimethylindole | 4-(1'-naphthoyl)-1-methyl-β-chloroethylaminobenzene | currant-grey |
| 1-methyl-2-phenylindole | 4-(1'-naphthoyl)-1-methyl-β-chloroethylaminobenzene | strongly greenish blue |
| 1,2-dimethylindole | 4-(1'-naphthoyl)-1-ethyl-β-cyanoethylaminobenzene | currant-grey |
| 1-methyl-2-phenylindole | 4-(1'-naphthoyl)-1-ethyl-β-cyanoethylaminobenzene | strongly greenish blue |
| 1,2-dimethylindole | 4-(1'-naphthoyl)-1-phenylmethylaminobenzene | blue-grey |
| 1,2-dimethylindole | 4-(1'-naphthoyl)-1-benzylethylaminobenzene | blue-grey |
| 1-methyl-2-phenylindole | 4-(1'-naphthoyl)-1-benzylethylaminobenzene | strongly bluish green |
| 1,2-dimethylindole | 4-(1'-naphthoyl)-1-methyl-(4''-ethoxyphenyl)-aminobenzene | greenish blue |
| 1-methyl-2-phenylindole | 4-(1'-naphthoyl)-1-methyl-(4''-ethoxyphenyl)-aminobenzene | strongly greenish blue |
| 1,2-dimethylindole | 4-(1'-naphthoyl)-1-dimethylamino-3-methylbenzene | greenish blue |
| 1-methyl-2-phenylindole | 4-(1'-naphthoyl)-1-dimethylamino-3-methylbenzene | blue-grey |
| 1-ethyl-2-phenyl-6-ethylindole | 4-(1'-naphthoyl)-1-dimethylamino-3-methylbenzene | grey-green |
| 1-n-butyl-2-phenylindole | 4-(1'-naphthoyl)-1-dimethylamino-3-methylbenzene | grey-green |
| 1-benzyl-2-phenylindole | 4-(1'-naphthoyl)-1-dimethylamino-3-methylbenzene | blue-green |
| 1-benzyl-2-phenyl-7-methylindole | 4-(1'-naphthoyl)-1-dimethylamino-3-methylbenzene | grey-green |
| 1,2-dimethylindole | 4-(1'-naphthoyl)-1-morpholinobenzene | currant-grey |
| 1-methyl-2-phenylindole | 4-(1'-naphthoyl)-1-morpholinobenzene | strongly greenish blue |
| 1,7-dimethyl-2-phenylindole | 4-(1'-naphthoyl)-1-morpholinobenzene | blue-green |
| 1-ethyl-2-phenyl-7-chloroindole | 4-(1'-naphthoyl)-1-morpholinobenzene | bluish green |
| 1-n-butyl-2-phenyl-6-methylindole | 4-(1'-naphthoyl)-1-morpholinobenzene | strongly greenish blue |
| 1-isobutyl-2-phenylindole | 4-(1'-naphthoyl)-1-morpholinobenzene | greenish blue |
| 1,2-dimethylindole | 4-(1'-naphthoyl)-1-phenylmethylaminonaphthalene | blue-grey |
| 1-methyl-2-phenylindole | 4-(1'-naphthoyl)-1-phenylmethylaminonaphthalene | blue-grey |
| 2-methylindole | 2-(4'-dimethylaminobenzoyl)-naphthalene | strongly reddish grey |
| 1,2-dimethylindole | 2-(4'-dimethylaminobenzoyl)-naphthalene | strongly greenish grey |
| 1-methyl-2-phenylindole | 2-(4'-dimethylaminobenzoyl)-naphthalene | bluish green |
| 2-methylindole | 2-(4'-diethylaminobenzoyl)-naphthalene | somewhat reddish blue |
| 1,2-dimethylindole | 2-(4'-diethylaminobenzoyl)-naphthalene | blue-green |
| 1-methyl-2-phenylindole | 2-(4'-diethylaminobenzoyl)-naphthalene | bluish green |
| 2-methylindole | 2-(4'-di-n-propylaminobenzoyl)-naphthalene | strongly greenish blue-grey |
| 1,2-dimethylindole | 2-(4'-di-n-propylaminobenzoyl)-naphthalene | covered blue-green |

—Continued

| Indole | Diaryl ketone | Shade on polyacrylonitrile |
|---|---|---|
| 1-methyl-2-phenylindole | 2-(4'-di-n-propylaminobenzoyl)-naphthalene | bluish green |
| 2-methylindole | 2-(4'-phenyl-methyl-aminobenzoyl)-naphthalene | covered greenish blue |
| 1,2-dimethylindole | 2-(4'-phenyl-methyl-aminobenzoyl)-naphthalene | blue-green |
| 1-methyl-2-phenylindole | 2-(4'-phenyl-methyl-aminobenzoyl)-naphthalene | somewhat bluish green |

EXAMPLE 2

15 Parts by weight 1-methyl-2-phenyl-3-benzoylindole are condensed at 105°C for 10 hours with 9.6 parts by weight 1-diethylaminonaphthalene and 25 parts by weight phosphorus oxychloride. The melt is then poured into 1,000 parts by volume of water, the suspension stirred for 3 hours and the dyestuff subsequently separated from the solution. The dyestuff is dissolved in 1,000 parts by volume of boiling water containing 50 parts by volume glacial acetic acid, the solution is clarified with active charcoal and the dyestuff subsequently salted out with 100 parts by weight of common salt. The resultant dyestuff of the formula

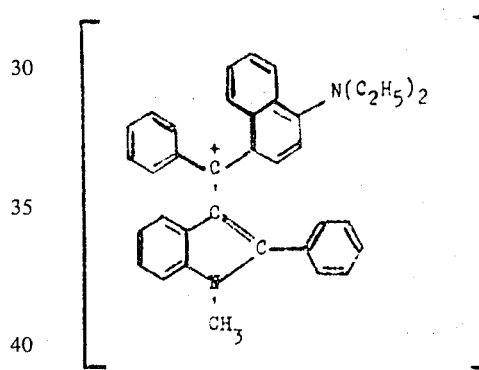

dyes materials of polyacrylonitrile in a blue-green shade of very good fastness properties.

EXAMPLE 3

Polyacrylonitrile fibres are introduced at 40°C, in a goods-to-liquor ratio 1 : 40, into an aqueous bath which contains, per litre, 0.75 g 30% acetic acid, 0.38 g sodium acetate, 0.3 g of the aminodiaryl-indolylmethane dyestuff according to the formula of Example 1. The bath is heated to boiling temperature within 20 to 30 minutes and kept at this temperature for 30 to 60 minutes. The polyacrylonitrile fibres are subsequently rinsed and dried. A blue-green dyeing of very good fastness to light is obtained.

EXAMPLE 4

Acid-modified polyglycol terephthalate fibres of the type DACRON 64 (Du Pont), or those described in Belgian Patent Specification No. 549,179 and in U.S. Pat. No. 2,893,816, are introduced at 20°C, in a goods-to-liquor ratio 1 : 40, into an aqueous bath which contains, per litre, 3 g sodium sulphate, 0.5 to 2 g of an oleyl polyglycol ether (50 mol ethylene oxide), 2.5 to 5 g diphenyl and 0.3 g of the dyestuff of the formula of Example 1, and was adjusted to a pH value of 4.5 to 5.5 with acetic acid. The bath is heated to 98°C within 30 minutes and kept at this temperature for 60 minutes. The fibres are subsequently rinsed and dried. A blue-green dyeing of very good fastness properties is obtained.

EXAMPLE 5

Acid-modified polyglycol terephthalate fibres, as in Example 4, are introduced at 20°C, in a goods-to-liquor ratio 1 : 40, into an aqueous bath which contains, per litre, 6 to 10 g sodium sulphate, 0.5 to 1 g oleyl polyglycol ether (50 mol ethylene oxide), 0 to 15 g dimethyl-benzyl-dodecylammonium chloride and 0.3 g of the dyestuff of the formula of Example 1, and was adjusted to a pH of 4 — 5 with acetic acid. The bath is heated to 120°C within 30 minutes and kept at this temperature for 60 minutes. The fibres are subsequently rinsed and dried. A blue-green dyeing of very good fastness properties is obtained.

EXAMPLE 6

A fabric of polyacrylonitrile is printed with a printing paste which was prepared in the following manner:

30 Parts by weight of the aminodiphenyl-indolylmethane dyestuff of the formula of Example 1, 50 parts by weight thiodiethylene glycol, 30 parts by weight cyclohexanol and 30 parts by weight 30 acetic acid are covered with 330 parts by weight of hot water, and the resultant solution is added to 500 parts by weight of crystal gum (gum arabicum as thickening agent). 30 Parts by weight of a zinc nitrate solution are finally added. The print obtained is dried, steamed for 30 minutes and subsequently rinsed. A blue-green print with very good fastness properties is obtained.

EXAMPLE 7

A stock solution is prepared from 15 parts by weight of the dyestuff mentioned in Example 1, 15 parts by weight polyacrylonitrile and 70 parts by weight dimethyl formamide; this stock solution is added to a usual spinning solution of acrylonitrile which is spun in known manner. A blue-green dyeing of very good fastness properties is obtained.

We claim:
1. A dyestuff having the formula

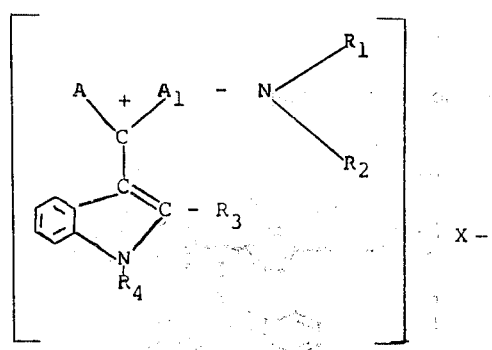

in which
the radicals A and $A_1$ stand for members of the class phenyl and naphthyl, of which at least one represents naphthyl,
$R_1$ stands for hydrogen; lower alkyl, hydroxyethyl; chloroethyl; cyanoethyl; benzyl; phenyl; or ethoxyphenyl;
$R_2$ stands for hydrogen; lower alkyl; hydroxyethyl;
$R_3$ denotes hydrogen; methyl; phenyl; chlorophenyl;
$R_4$ stands for hydrogen; lower alkyl; cyanoethyl; benzyl; and the dyestuff may contain a further substituent in the phenyl radical of the indole ring selected from the group consisting of Cl, methyl and ethyl or a further substituent in A and $A_1$ of the groups Cl, Br, methyl and methoxy; and
X is a largely colorless anionic radical which does not impair the solubility of the dyestuff in an undesirable way.

2. A dyestuff having the formula

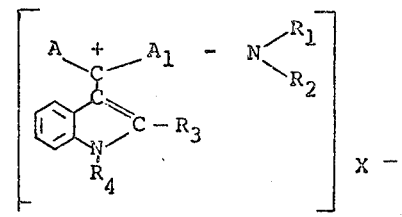

in which
$R_1$ is hydrogen; lower alkyl; phenyl; phenyl monosubstituted by chlorine, bromine, lower alkyl or lower alkoxy; or benzyl;
$R_2$ is hydrogen; lower alkyl or benzyl;
$R_3$ is methyl; phenyl; or phenyl monosubstituted by chlorine, bromine, lower alkyl, or lower alkoxy;
$R_4$ is hydrogen; lower alkyl; or benzyl;
A and $A_1$ are phenyl or naphthyl provided at least one is naphthyl;
X is a largely colorless anionic radical which does not impair the solubility of the dyestuff in an undesirable way and wherein the indolyl, phenyl and naphthyl rings of the dyestuff may be further monosubstituted by chlorine, bromine, lower alkyl or lower alkoxy.

3. A dyestuff of claim 2 having the formula

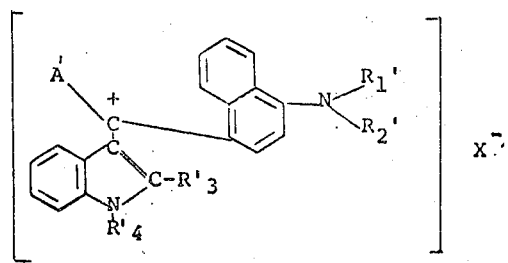

in which
$R_1'$ is hydrogen; lower alkyl; phenyl; phenyl monosubstituted by chlorine, bromine, lower alkyl or lower alkoxy, or is benzyl;
$R_2'$ is hydrogen; lower alkyl; or benzyl;
$R_3'$ is methyl; phenyl; or phenyl monosubstituted by chlorine, bromine, lower alkyl or lower alkoxy;
$R_4'$ is hydrogen; lower alkyl or benzyl;
A' is phenyl or phenyl monosubstituted by chlorine, bromine, lower alkyl or lower alkoxy; the naphthylene ring is unsubstituted or monosubstituted by chlorine, bromine, lower alkyl, or lower alkoxy; wherein the phenyl ring of the indolyl ring is unsubstituted, or monosubstituted, by chlorine, bromine, lower alkyl, or lower alkoxy and wherein X is as defined before.

4. A dyestuff of claim 1 having the formula

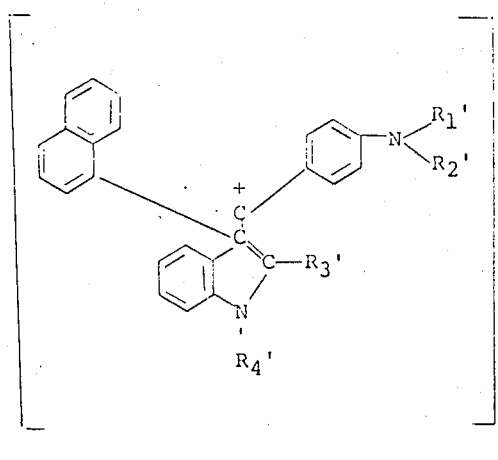

in which
- $R_1'$ is hydrogen; lower alkyl; phenyl; phenyl monosubstituted by chlorine, bromine, lower alkyl or lower alkoxy; or is benzyl;
- $R_2'$ is hydrogen; lower alkyl; or benzyl;
- $R_3'$ is methyl; phenyl; or phenyl monosubstituted by chlorine, bromine, lower alkyl or lower alkoxy;
- $R_4'$ is hydrogen; lower alkyl or benzyl; and the phenyl ring and the naphthylene ring, independently of each other are unsubstituted or monosubstituted by chlorine, bromine, lower alkyl, or lower alkoxy; wherein the phenyl ring of the indolyl ring is unsubstituted, or monosubstituted by chlorine, bromine, lower alkyl or lower alkoxy; and wherein
- X is as defined before 5. A dyestuff of claim 1 having the formula:

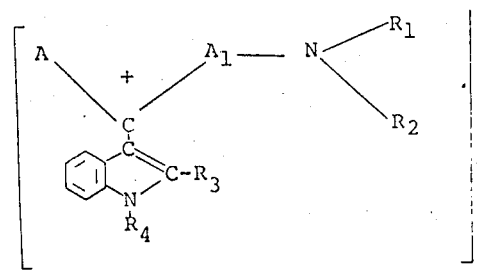

wherein
- A and $A_1$ are selected from the group consisting of phenyl, and naphthyl with the proviso that at least one is naphthyl,
- $R_1$ is selected from the group consisting of methyl, ethyl, chloroethyl, cyanoethyl, propyl, phenyl, ethoxyphenyl or benzyl,
- $R_2$ is selected from the group consisting of methyl, ethyl, or propyl,
- $R_3$ is methyl, or phenyl,
- $R_4$ is hydrogen, $C_{1-4}$ alkyl, cyanoethyl, or benzyl wherein the phenyl ring of the indole radical is unsubstituted or is monosubstituted by a member of the group consisting of methyl, ethyl, and chloro and wherein
- A and $A_1$ are unsubstituted or monosubstituted by a member of the group consisting of chloro, bromo, methyl and methoxy; and wherein
- X is as defined before.

6. The dyestuff having the formula

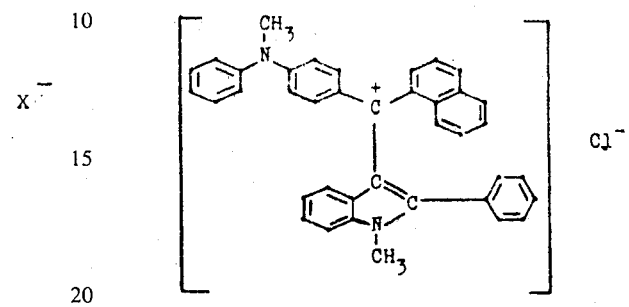

7. The dyestuff having the formula

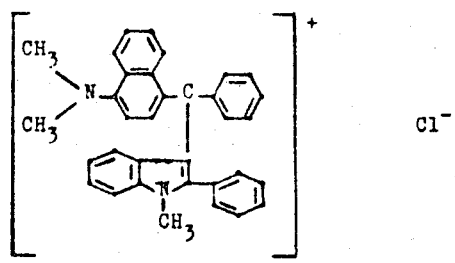

8. The dyestuff having the formula

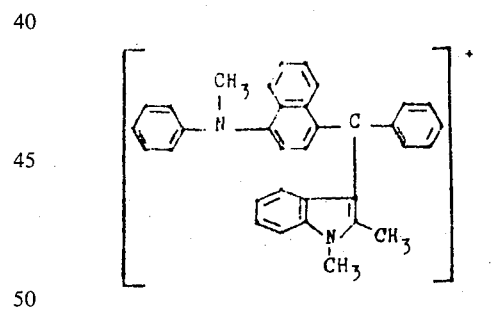

9. The dyestuff having the formula

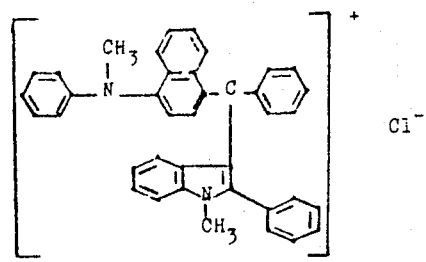

10. The dyestuff having the formula

13
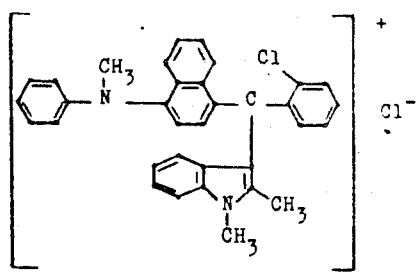
11. The dyestuff having the formula
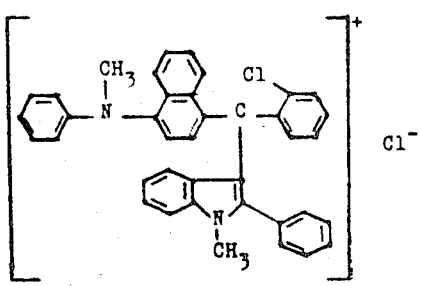
12. The dyestuff having the formula
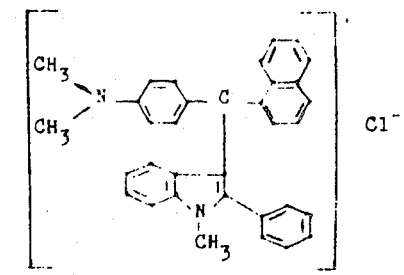
13. The dyestuff having the formula
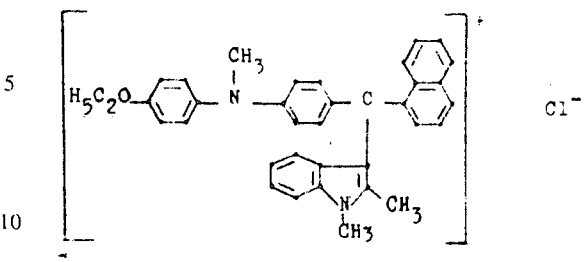
14. The dyestuff having the formula
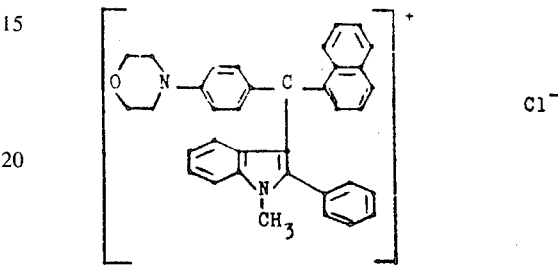
15. The dyestuff having the formula
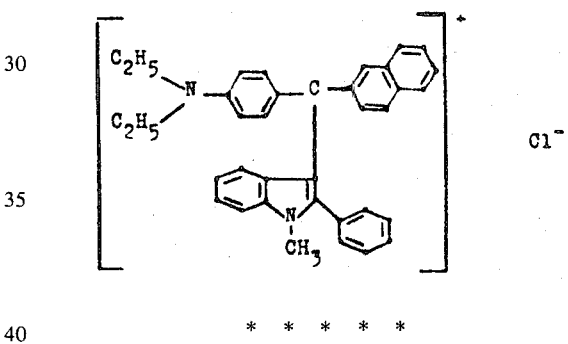
* * * * *